July 4, 1950

B. T. GROBOWSKI 2,513,311

LAWN MOWER

Filed Jan. 17, 1947

INVENTOR.
*Benny T. Grobowski*
BY
*Cubitt, Mahoney + Miller*
ATTORNEYS

July 4, 1950  B. T. GROBOWSKI  2,513,311
LAWN MOWER
Filed Jan. 17, 1947  4 Sheets-Sheet 2

INVENTOR.
*Benny T. Grobowski.*
BY
*Curbeth, Mahoney & Miller*
ATTORNEYS

INVENTOR.
Benny T. Grobowski.
BY
ATTORNEYS

July 4, 1950  B. T. GROBOWSKI  2,513,311
LAWN MOWER
Filed Jan. 17, 1947  4 Sheets-Sheet 4

INVENTOR.
*Benny T. Grobowski.*
BY
*Corbett, Mahoney & Miller*
ATTORNEYS

Patented July 4, 1950

2,513,311

UNITED STATES PATENT OFFICE 2,513,311

LAWN MOWER

Benny T. Grobowski, Newark, Ohio, assignor to The E. T. Rugg Company, Newark, Ohio, a corporation of Ohio Application January 17, 1947, Serial No. 722,641

19 Claims. (Cl. 56—249)

My invention relates to a lawn mower. It has to do, more particularly, with a lawn mower of improved rugged construction which is of such a nature that the various necessary adjustments for proper operation are facilitated.

This application is a continuation-in-part of my co-pending application, Serial No. 665,868, filed April 29, 1946.

In the prior art, various and sundry lawn mower structures have been provided. One disadvantage of prior art lawn mower structures is that they are of such a nature that relative distortion or "springing" of the supporting frame, the cutting reel, and the cutting bar often occurs upon striking objects in the grass, such as small stones and twigs. Springing of any of these parts obviously prevents proper operation of the mower and is generally impossible to correct properly. Another disadvantage of prior art structures resides in the fact that they usually include complicated structures for adjusting the mower to vary the depth of cut and for positioning the cutter bar relative to the cutter reel. Furthermore, these adjustments are difficult to make properly and accurately with such structures and tools usually must be employed. Also, with prior art structures, various operating parts are not sufficiently protected from clogging by grass and dirt.

One of the objects of my invention is to provide a lawn mower of an extremely rugged construction which is of such a nature that distortion or springing of various parts, which tend to result from striking objects such as stones or twigs, will be precluded.

Another object of my invention is to provide a lawn mower wherein the cutting reel and cooperating cutter bar are both supported by the same rugged frame unit so that there will be no danger of relative displacement or distortion during operation of the mower.

Another object of my invention is to provide a lawn mower having a simple yet effective structure for quickly, easily and accurately adjusting the mower to vary the depth of cut, such adjustment being accomplished without the use of wrenches, screw drivers or other tools and with the setting and resetting of a minimum number of adjusting mechanism parts.

Another object of my invention is to provide simple adjusting mechanism which automatically locks itself but which can be released with little effort in order to adjust the structure for varying the depth of cut of the mower.

Another object of my invention is to provide a simple, effective and easily operable structure in a lawn mower for adjusting the cutting reel accurately relative to the cutter bar, such adjustment also being accomplished without the use of tools.

Still another object of my invention is to provide a lawn mower which is provided with a simple arrangement of structure for protecting the various operating parts thereof completely and effectively from clogging by grass or dirt.

Various other objects will be apparent hereinafter.

In its preferred form, I provide a lawn mower in which extreme rigidity is accomplished by providing a transversely extending yoke or frame unit which supports both the cutting reel and the cutter bar in rigid association with each other. The cutter bar is rigidly carried on the bottom portion of the yoke or frame and removably carries a knife. This yoke further serves to aid in connecting together rigidly, insofar as lateral movement is concerned, the side plates of the mower which, in turn, rigidly carry the axles for the supporting wheels. The side plates also carry the transversely extending ground-engaging roller at a point near their rear ends and behind the yoke. Forward of the yoke there is also provided a transversely extending bumper bar which has its ends connected to the side plates. The roller and bumper bar are connected to the side plates in such a manner as to increase the lateral rigidity of the structure.

The cutting reel is provided with the usual shaft which is supported in bearings, carried by the vertical arms of the yoke, so that it is substantially parallel to the cutter bar. For accurately adjusting the knives of the cutting reel relative to the knife carried by the cutter bar, an adjustable eccentric is associated with the bearing provided at each end of the cutting reel shaft. Each of these eccentrics may be easily and quickly rotated by means of a worm and gear structure associated therewith which may be actuated by a rotatable knob conveniently located. Adjustment of the eccentrics will move the cutting reel shaft vertically relative to the cutter bar and, consequently, the cutting knives of the cutting reel will be adjusted accurately relative to the knife carried by the cutter bar. Furthermore, either end of the cutting reel shaft may be adjusted independently of the other. Due to the provision of the worm and gear in each of the end adjusting structures, the structure will be self-locking.

In order to provide for proper adjustment to vary the depth or height of cut of the cutting reel and associated cutter bar knife, I provide means for quickly and easily adjusting the entire assembly, which includes the yoke and the cutting reel and cutter bar carried thereby, vertically relative to the wheels, the side plates and the ground-engaging roller. This is accomplished by providing in association with each of the side plates a disc which has a gear segment formed thereon and which is mounted for rotation on the wheel-supporting axle, the gear segment being concentric with the axle. Each end of the yoke is rigidly fastened to one of these gear segment discs and will, consequently, move therewith. In order to rotate the gear segment discs and, in turn, move the yoke vertically, a pinion is associated with each gear segment. These two pinions may be keyed on opposite ends of the bumper bar which has its ends rotatably mounted in the side plates. The bumper bar may be rotated to rotate both pinions simultaneously by means of knobs preferably disposed at both ends of the bumper bar adjacent the side plates. Each of these knobs is splined to the bar and is forced by a spring normally into engagement with the associated side plate, interfitting portions being provided on these members to normally lock the knob and prevent rotation of the bumper bar. Rotation of the pinions will rotate the gear segment discs about the wheel axles and since they carry the yoke which supports the cutting reel and cutter bar, these members will be adjusted vertically relative to the supporting wheels so as to vary the depth of cut.

In a modified form of my mower, each of the raising and lowering pinions may be rotated by a train of gears actuated by rotation of the roller supporting shaft, the ends of which will be rotatably carried by the side plates. This shaft may be rotated by an adjusting pinion keyed thereon adjacent one end thereof and which has a normally engaged locking means associated therewith.

The foregoing and other objects and advantages of the present invention will appear from the following description and appended claims when considered in connection with the accompanying drawings forming a part of the specification wherein like reference characters designate corresponding parts in the several views and wherein:

Figure 5:
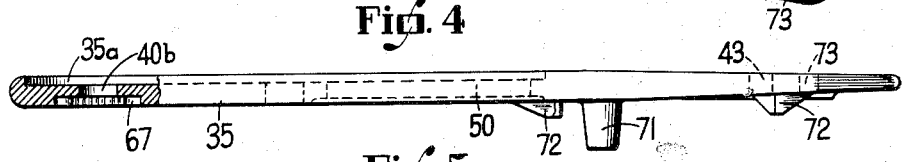
Figure 5 is a plan view of the side plate of Figure 4.

With reference to the drawings, I have illustrated my lawn mower as comprising a one-piece frame unit 1 which may be termed a yoke. This yoke 1 (Figures 1, 2 and 3) is rigidly cast in one piece and preferably consists of a top bar 2, a bottom cutter bar 3 and vertically disposed connecting side arms 4. The bars 2 and 3 extend transversely substantially the full width of the mower and are integrally joined to the arms 4 at the ends thereof. The arms 4 have bearing cups 5 cast therein and these cups have their interiors machined properly to receive the bearings. The upper portion 6 of each arm 4 extends substantially vertically above the bearing cup 5 while the lower portion 7 of each arm is inclined rearwardly. The cutter bar 3 is provided with a lower flat surface 8, which is substantially horizontally disposed, against which is secured, by means of a plurality of longitudinally spaced clamping screws 9, a cutter knife 10. The knife 10 (Figures 2 and 5) is provided with a forward cutting edge 11.

The yoke 1 supports a cutting reel 13, which is of usual construction and which includes the spiders 14 which carry the reel cutter knives 15. The spiders 14 are carried by a shaft 16, the ends of which extend into the bearing cups 5 which contain the ball bearing units 17 (Figure 3) that rotatably support the shaft. For accurately adjusting the cutting reel knives 15 relative to the cutter bar knife 10, mechanism like that disclosed in my co-pending application, Serial No. 665,868, is provided and includes an adjustable eccentric 18 which is associated with each of the ball bearings 17 and is rotatably disposed in the bearing cup 5. The eccentric has an outer cylindrical surface which rotatably fits in the bearing cup 5 and has an inner socket 19 which is located eccentrically of the bearing cup and which receives the ball bearing 17. The end of the shaft 16 extends through an enlarged opening 20 at the inner side of the cup 5 so that the shaft may move laterally relative to the cup. The shaft fits rotatably but tightly in an opening 21 formed in member 18 and which is eccentric thereof. The shaft passes centrally through the ball bearing 17. Thus, it will be apparent that when the eccentric 18 is rotated, the shaft will be moved in such a manner that its axis moves laterally of the bearing cup 5. To rotate the eccentric 18 and produce this movement, the eccentric has a worm gear portion 22 formed on its inner side. This portion 22 is engaged by a worm 23 (Figures 2 and 3) which is formed on the lower end of a vertically disposed worm shaft 24. The worm 23 and shaft 24 are disposed in a vertical socket 25 formed as a part of the bearing cup 5 and which is disposed substantially tangential to the inner part of the bearing cup. The lower end of shaft 24 is rotatably mounted in a nut 26 that is threaded into the upper end of the socket 25 and in a socket 26a at the bottom of socket 25. The inner end of nut 26 engages the upper end of worm 23 and thus prevents upward movement of the shaft. The upper end of the shaft 24 is provided with a knurled knob 27 (Figures 1 and 2) and it will be noted that the shaft extends upwardly a sufficient distance so that this knob will be located conveniently.

It will be apparent that either of the eccentrics 18 can be actuated to adjust the corresponding end of the shaft 16 vertically and that such adjustment can be accomplished conveniently and easily without the use of tools. Because of the worm and gear, the adjusting structure will be self-locking. The structure at each end of the shaft may be actuated independently of the other. This adjustment will move the entire cutting reel 13 vertically so that the knives 15 thereof may be adjusted closely relative to the knife 10 carried by the cutter bar. Thus, either end of the cutting reel may be adjusted independently of the other and with precision.

The shaft 16 has a pinion 28 (Figure 3) disposed on each end thereof. These pinions 28 are loosely disposed on the shaft. Each pinion has a clutch housing 29 formed on its inner end. Each of the housings 29 receives a clutch unit 30 which is of a free-wheeling type in common use. This clutch will serve to rotate the shaft 16 when the pinion 28 is rotated in one direction, but will not drive the shaft upon rotation of the pinion in the opposite direction.

The opposite ends of the shaft 16 extend into the supporting and driving wheels 31 and each of the pinions 28 is driven by means of an internal ring gear 32 (Figure 3) formed in each wheel. Each of the wheels 31 is of the structure disclosed in my co-pending application, Serial No. 649,075, filed February 20, 1946, now Pat. No. 2,432,621, granted December 16, 1947, and, therefore, need not be described in detail in this application. As shown best in Figure 3, each wheel 31 is carried by a stub axle 33. This axle is provided with a reduced threaded inner end 34 which extends through an opening formed in the vertically disposed side plate 35 of the mower. The axle 33 is clamped to the plate 35 by means of a clamping nut 36 threaded on the portion 34 of the axle.

Directly outside each side plate 35 (Figure 3), a gear segment disc 37 is disposed in abutting relationship thereto and within a recess 35a formed therein. The disc 37 is provided with a central opening in which a reduced part 34a of the axle 33 is disposed so that the disc is mounted for rotation about the axis. The disc 37 is provided with an outwardly projecting peripheral flange 38 which extends into an annular groove 39 formed in the periphery of the wheel 31. Thus, the wheel is free to rotate relative to the disc 37, but the flange 38 extends into the groove 39 and effectively precludes the entrance of grass and dirt within the wheel 31.

Figure 1:
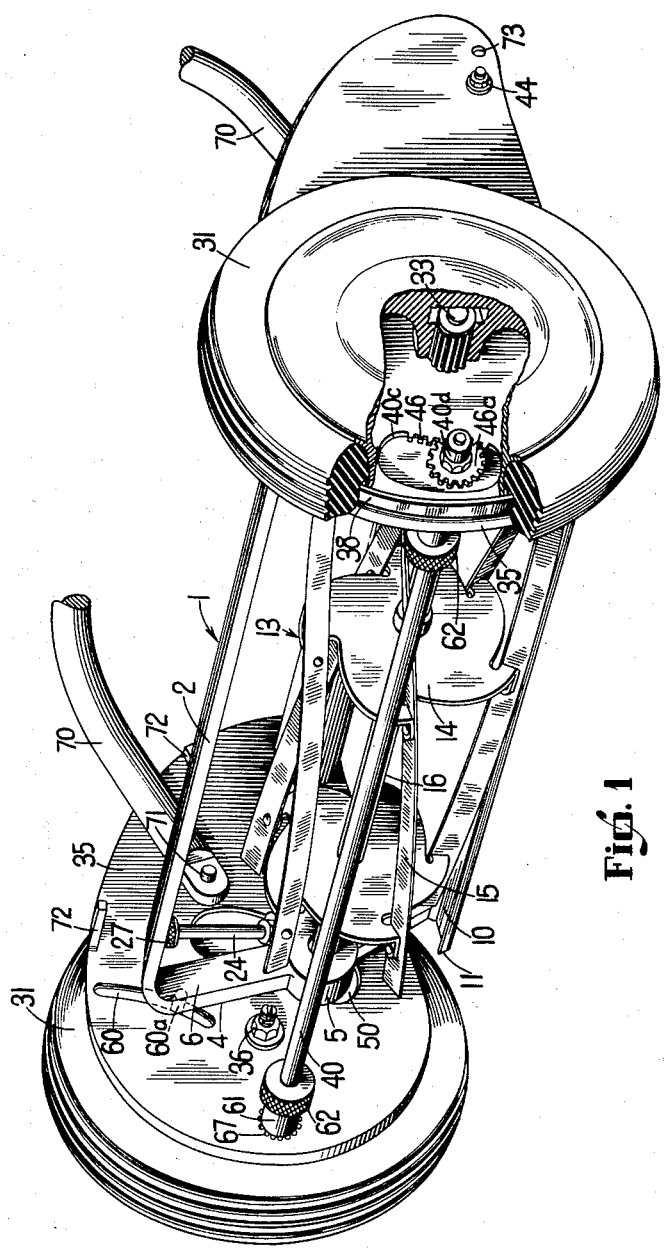
Figure 1 is a perspective view, partly broken away, of a lawn mower constructed in accordance with my invention.
Figure 2:
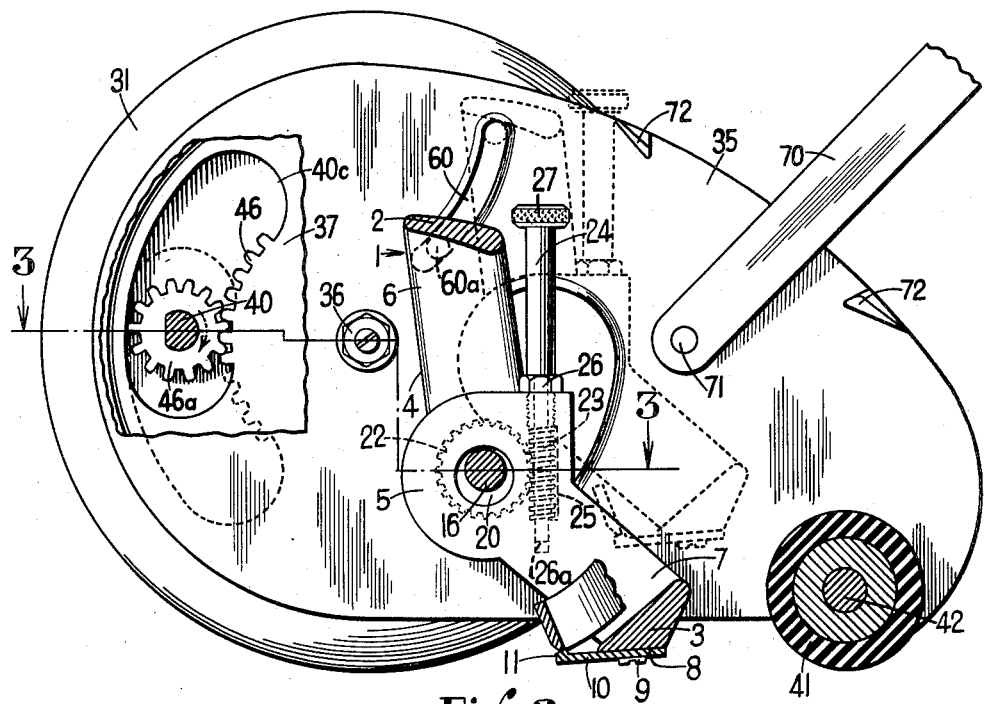
Figure 2 is an inside view of one end of the mower.
Figure 3:
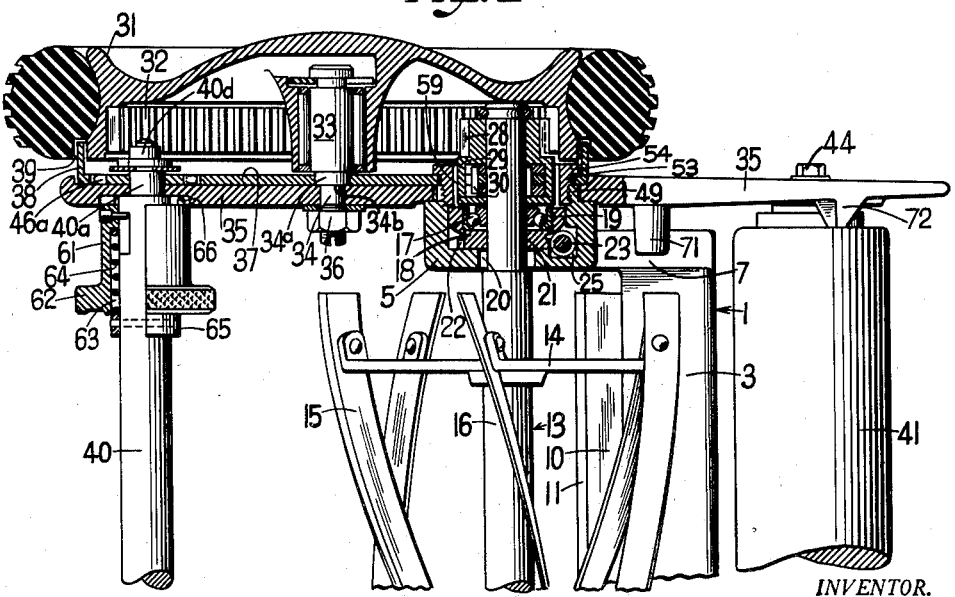
Figure 3 is a view of one end of the mower partly in section along line 3—3 of Figure 2 and partly in plan.
Figure 4:
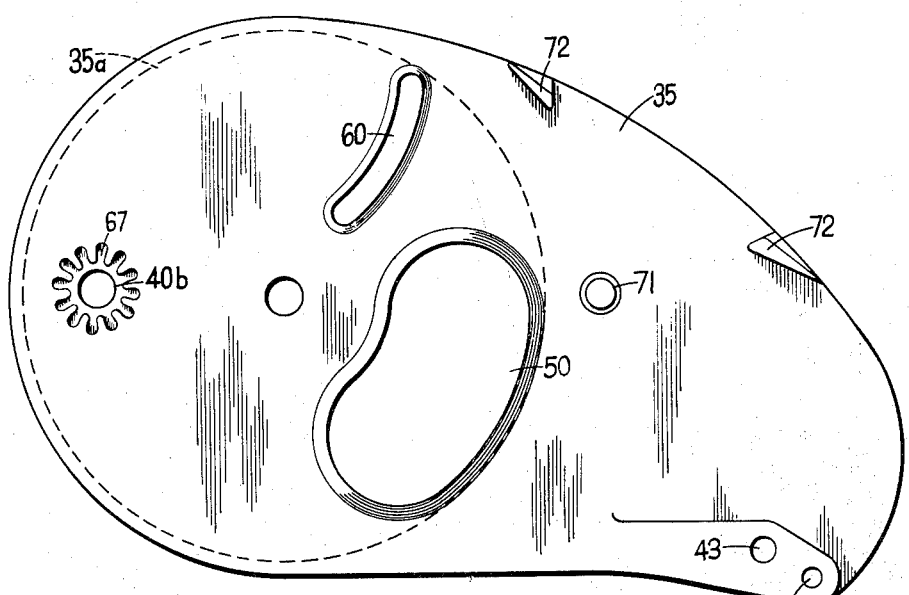
Figure 4 is an inside view of the side plate of the mower.
Figure 6:
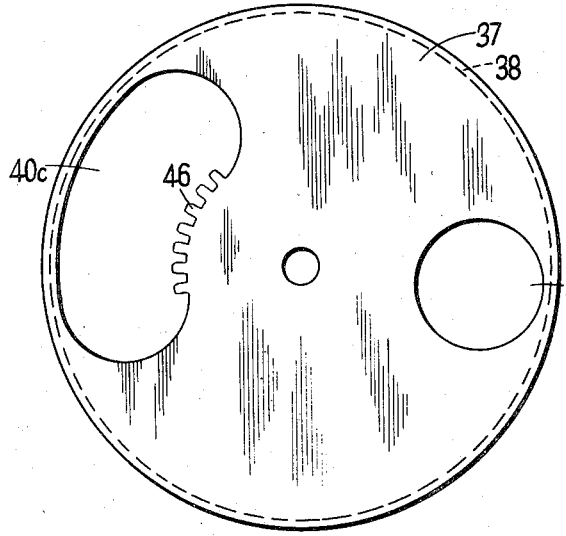
Figure 6 is an outside view of one of the segment-carrying discs of the height adjusting mechanism.
Figure 7:
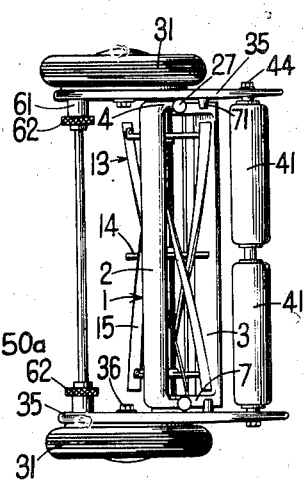
Figure 7 is a plan view of the entire mower structure.

It will be noted from Figure 4, that the side plates 35 are wider or higher at their forward ends than at their rear ends and that both the forward and rear ends are of arcuate form. The two plates are rigidly secured together adjacent their forward ends to prevent lateral movement thereof by means of the bumper bar 40 (Figures 1 and 7) which extends transversely the full width of the mower ahead of the cutting reel 13. Each end of the bumper bar 40 (Figure 3) is reduced, as indicated at 40a, and extends through an opening 40b (Figures 3 and 4) in plate 35 and through an arcuate slot 40c (Figures 2 and 6) in the disc 37. Thus, the ends of the bar 40 are rotatably mounted in the openings 40b of the side plates 35. It will be noted that the nut 36 and axle 33 serve to hold the side plates 35 and disc 37 in association with each other, the shoulders 34b on axles 33 preventing the discs 37 from being clamped to the plates 35. The rear and lower ends of the side plates 35 carry the ground-engaging roller 41, as shown in Figures 2, 3 and 7. The roller 41 is carried rotatably by a transversely extending shaft 42 that has reduced ends, each of which extends into an opening 43 (Figure 4) in the side plates 35 and is clamped thereto by means of a clamping nut 44. Thus, the plates 35 are rigidly connected together at their forward and rear end by means of a bumper bar 40 and the roller shaft 42 which prevent relative lateral displacement of the side plates 35. Furthermore, as will be apparent hereinafter, the yoke 1 cooperates with the side plates 35 to increase this rigidity.

In order to provide for proper adjustment to vary the depth or height of the cutting reel 13 and associated cutter bar 10, I provide means for vertically adjusting the yoke 1. This adjustment is accomplished while maintaining substantially constant the angle of the cutter bar knife 10 relative to the ground. The yoke 1 and, therefore, the cutting reel 13 and the knife 10 which are carried by the yoke are moved vertically relative to the ground. To accomplish this each end of the yoke 1 is carried by one of the gear segment discs 37, as illustrated best in Figures 2 and 3. As previously indicated, the gear segment discs 37 are disposed directly outside the plates 35. Each of the discs 37 is provided with a gear segment 46 formed on the inner edge of the slot 40c formed in the disc. The slot 40c and the segment 46 are concentric with the axle 33. The reduced ends 40a of bar 40, as previously indicated, extend into the arcuate slots 40c. Each of these ends of the bar carries a pinion 46a which is keyed thereto and meshes with the gear segment 46 as shown best in Figures 2 and 3. A nut 40d threaded on each end of the bar 40 serves to prevent displacement of the pinion 46a from the ends of the bar.

As previously indicated, the yoke 1 is carried by the gear segment disc 37 so that it will be adjusted vertically upon rotation of disc 37 about the axis of the axles 33. It will be apparent that rotation of the discs 37 may be accomplished by rotation of bar 40 which rotates the pinions 46a that mesh with the gear segments 46 of discs 37. To mount the yoke 1 on the discs 37, as shown best in Figure 3, the exterior of each bearing cup 5 formed on the yoke 1 is provided adjacent its outer side with a reduced extension 49. The extension 49 fits into and is adapted to move within an arcuate slot 50 (Figures 2, 3 and 4) which is formed within the side plates 35 and is concentric with the axle 33. The slot 50 extends from a point just behind the axle of the wheel 33 to a point just above the axle, as shown best in Figure 2. Threaded into the extension 49 of the bearing cup 5 is a nut 53 (Figure 3). This nut 53 has its inner edge engaging the eccentric 18 and serving to hold it in the bearing cup. This nut passes inwardly through an opening 50a (Figures 3 and 6) which is formed in the disc 37. The outer edge of the nut 53 is provided with a peripheral flange 54 which extends beyond the edges of the opening 50a.

In assembling this structure, the plate 35 at each end of the mower is positioned on the bearing cup 5 by slipping the extension 53 thereof into the arcuate slot 50 of the plate. The disc 37 is then positioned adjacent the side plates 35 and the wheel axle is clamped to the plate 35, the discs 37 being rotatably mounted on the axle. At the same time that the structures at each end of the mower are assembled, the opposite ends of the bumper bar 40 and the roller shaft 43 are properly connected to the plates 35. Thus, a complete rigid structure will be assembled. The rigidity is increased by the yoke 1 due to the fact that the nuts 53, which are threaded into the cups 5 carried by the yoke, are provided with the flanges 54 which overlap the disc 37 and will thereby prevent lateral displacement of the side plates 35 and associated parts. Consequently, extreme rigidity of the entire mower structure will result.

It will be noted from Figure 3 that the nut 53 is provided with an interior chamber 59 which receives the clutch housing 29. This chamber 59 is of larger diameter than the housing 29 in order to permit the required lateral displacement of the axis of the shaft 16 when the eccentrics 18 are rotated. Obviously, this lateral displacement also causes similar displacements of the pinion 28. However, the displacement necessary to obtain the precision adjustment of the cutting reel 13 relative to the cutter bar knife 10 is very slight and will not move the pinion out of mesh with the ring gear 32 of the wheel 31.

From the above description, it will be apparent that when the discs 37 are rotated by means of the bumper bar 40, the yoke 1 will be moved vertically. The extension 49 of the bearing cups 5 will move along the slots 50 formed in the plates 35. Thus, the cutting reel 13 and the cooperating cutting knife 10, which are both carried by the yoke 1, will be moved to different vertical positions to vary the height of cut of the mower. The arcuate slots 50 will always be covered by the disc 37 so as to prevent the entrance of dirt and grass through these slots 50 into the wheels 31. It will be apparent that when the yoke 1 is moved vertically, the pinions 28, carried by the cutting reel shaft 16, are also moved through arcuate paths. However, this will not interfere with meshing of the pinions 28 with the internal gears 31 of the wheels, due to the fact that the centers of the arcuate paths of movement of the pinions 28 coincide with the axis of the wheel axles 33 which are, of course, the centers of the ring gears 32.

As previously indicated, it is desirable to maintain the cutter knife 10 at substantially the same angle relative to the ground, regardless of the vertical position of the yoke 1. To accomplish this, as shown in Figures 1, 2 and 4, an arcuate guide groove 60 is formed in the inner surface of each side plate 35 at a point above and slightly behind the wheel axle 33. The yoke 1 carries at each side thereof a guide pin 60a which extends into the cooperating groove 60. The pins 60a are carried by the vertical portions 6 of the side arms 4 of the yoke adjacent the upper ends thereof. The grooves 60 are so disposed relative to the arcuate slots 50 in plates 35 along which the bearing cups 5 move, that during vertical movement of the yoke 1, the portions 6 of the side arms will remain upright due to the pins 60a operating on the grooves 60. During rotation of the disc 37 about the axles 33, the nuts 53 will rotate in the disc. Furthermore, the extensions 49 of bearing cups 5 will rotate in the arcuate slots 50 relative to plates 35 and will move along such slots. Thus, although the knife 10 will be moved to different heights, the angle of the knife 10 relative to the ground will be maintained throughout vertical adjustment thereof.

For rotating the bumper bar 40 in order to rotate the pinions 46a which, in turn, rotate the discs 37 to bring about the vertical adjustment of the yoke 1, I provide a very simple structure which is illustrated best in Figures 1, 3 and 7. This structure comprises a sleeve 61 which is splined to the bar 40 for axial but non-rotative movement relative thereto. One of these sleeves is provided at each end of the bar 40 and is provided with a knurled knob 62 by means of which it may be moved axially of the bar and by means of which the bar may be rotated. Within the sleeve 61 around the bar 40 a chamber 63 is formed which receives a compression spring 64. This spring bears at one end against the closed inner end of chamber 63 and at its opposite end against a collar 65 which is fixed to the bar 40. The spring 64 normally urges the sleeve 61 towards the adjacent plate 35. The inner end of the sleeve 61 is provided with a pin 66 which is adapted to cooperate with any of a plurality of circumferentially spaced indentations 67 (Figures 1, 2 and 4) which are provided in the inner surface of plate 35 around the opening 40b through which the bar 40 passes. Normally, rotation of the bar 40 will be precluded because the pins 66 carried by members 61 will be forced into indentations 67. However, when it is desired to rotate the bar 40, both of the sleeves 61 may be pulled outwardly by a grasping knob 62 and, consequently, the pins 66 will be withdrawn from the indentations 67. Then the bar 40 may be rotated by rotating the knobs 62. It will be noted that the collars 65 are of sufficiently small diameter to permit the chambers 63 and the sleeves 61 to move over such collars.

The handle 70 of the mower may be of any suitable type and may be pivotally attached to the side plates 35 by means of inwardly extending pivot pins 71 which are formed on the interior of the plates 35 as shown best in Figures 2, 3 and 4. Spaced stops 72 are also formed on the inside of plates 35 adjacent their upper edges to limit swinging movement of the handle 70 about the pivot pins 71. An opening 73 may be provided on the inside of each of the plates 35 adjacent the opening 43 for receiving the grass catching basket or container of the mower.

It will be apparent from the above description that I have provided a simple yet effective structure for quickly, easily and accurately adjusting the mower to vary the depth of cut. This adjustment is accomplished without the use of tools. The means for rotating the segment-carrying disc 37 to bring about this adjustment is very simple in structure and operation. The adjusting knobs can be released with little effort and will automatically lock themselves when released after the bumper bar has been rotated. The assembly at each side of or end of the mower is very simple merely consisting of a side plate, a segment-carrying disc and a wheel, the plate and disc being so arranged relative to the wheel as to prevent the entrance of dirt and grass thereinto.

Figure 8:
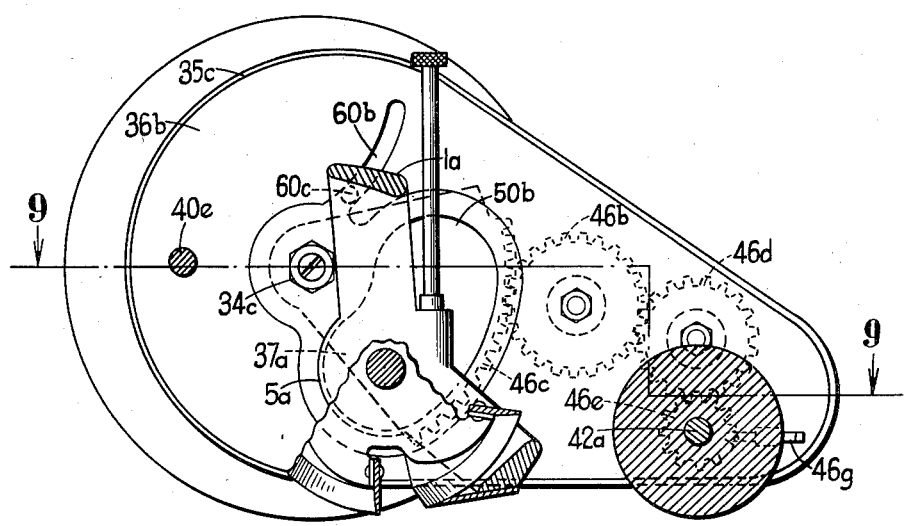
Figure 8 is an inside view, partly in section, of one end of a mower embodying my invention but having modified means for rotating the segment-carrying discs.
Figure 9:
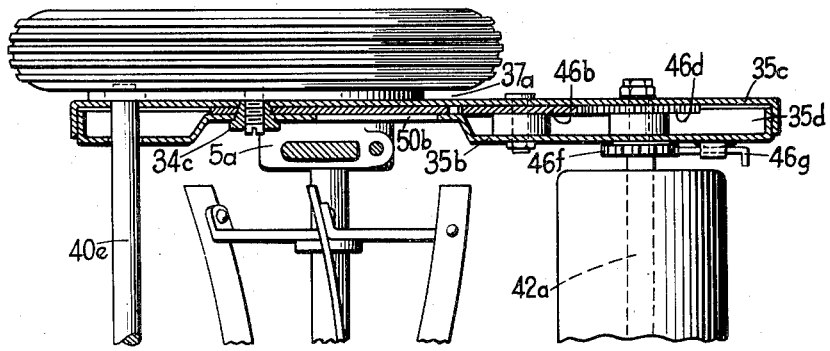
Figure 9 is a horizontal sectional view taken along line 9—9 of Figure 8.

In Figures 8 and 9, I have illustrated a modified arrangement for producing the vertical adjustment of the yoke and the cutting mechanism carried thereby. In this instance, the bearing structures 5a, and associated parts, provided on the ends of the yoke 1a extend through an arcuate slot 50b which is concentric with the axle 34c. In this instance, I not only provide the side plates 35b but also cover plates 35c outside the side plates. Between the plates 35b and 35c I provide a gear segment member 37a which is mounted for swinging movement about the axle 34c. It will be apparent that by swinging the segments 37a vertically, the yoke 1 will be moved vertically. To swing the segments vertically I provide train of gears located in a chamber 35d formed at each side of the mower between the rear parts of the plates 35b and 35c. Each of these train of gears embodies a pinion 46b which meshes with the gear teeth 46c of the segment 37a. Meshing with the pinion 46b is an idler pinion 46d which engages an actuating pinion 46e. The pinions 46e are keyed to the roller shaft 42a. When the roller shaft 42a is rotated, the gear segments 37a will be swung about the axles 34c and the yoke 1 will be moved vertically. For rotating the shaft 42a a knob 46f is provided inside one of the plates 35b and is keyed to the shaft. A pin 46g is associated with this knob and normally extends in one of a plurality of circumferentially spaced notches formed therein. When this pin is withdrawn, the knob 46f may be rotated to rotate the shaft 42a. Thus, in this form of my invention, I also provide a very simple arrangement for moving the yoke 1a vertically.

The slots 60b formed in the side plates 35b and the pins 60c which cooperate therewith and are carried by the yoke 1a, function in exactly the same manner as the slots 60 and pins 60a of the preferred form of my invention to keep the yoke 1a vertical. The bumper bar 40e passes through aligning openings in plates 35b and 35c and its ends are bolted to the plate 35c.

In forms of my invention the adjustment to vary the height of cut of the mower is accomplished by simply rotating a bar or shaft, for example, the bumper bar or roller shaft, which is mounted on the mower parallel to the cutting reel shaft which is to be moved vertically. Such bar or shaft is geared to the gear segments which are mounted for movement about the axes of the wheels and which carry the cutting reel shaft and associated parts which are to be moved vertically. Thus, the required adjustment at both sides of the mower can be accomplished with ease by rotating a single member.

It will be apparent from the above description that I have provided a lawn mower of an extremely rugged construction. The construction is such that the adjustment for varying the height of cut and the adjustment of the cutting reel relative to the cutter bar knife can be accomplished with ease and accuracy without the use of tools. Furthermore, the structure is such that the various gears and similar parts are protected from clogging by dirt or grass.

Various advantages of my mower structure have been discussed above. Others will be apparent from the preceding description, the drawings and the following claims.

Having thus described my invention, what I claim is:

1. A mower comprising a frame carried by wheels, a second frame carried by the first frame and supporting the cutting reel and associated cutter knife of the mower, means for adjusting the second frame vertically relative to the first frame, said means comprising gears which carry the second frame and which are mounted on the first frame for movement about the axes of said wheels, and means for moving said gears about said axes, said means comprising a transversely extending shaft rotatably mounted on the first frame and being geared to said gears, and means for rotating said shaft to produce movement of said gears.

2. A mower according to claim 1 wherein said shaft is the bumper bar carried by said first frame ahead of said cutting reel.

3. A mower according to claim 1 wherein said shaft is the shaft which supports the ground-engaging roller and is carried by said first frame behind said cutting reel.

4. A mower comprising a frame carried by wheels, a second frame carried by the first frame and supporting the cutting reel and associated cutter knife of the mower, means for adjusting the second frame vertically relative to the first frame, said means comprising gear segment discs which are rotatably mounted on the first frame on the axles of said wheels and means for moving said discs about said axles, said means comprising a transversely extending shaft rotatably mounted on the first frame, a pinion on each end of said shaft for rotation therewith and engaging the gear segment of the associated gear segment disc, means for rotating said shaft, and means for normally locking said shaft against rotation.

5. A mower comprising a frame which includes side plates rigidly connected together by a transversely extending bumper bar at the forward side of the mower and a ground-engaging roller at the rear side of the mower, supporting wheels mounted on said side plates by axles which are rigidly secured thereto, a second rigid frame which supports the cutting reel and associated cutter knife of the mower, a segment-carrying disc mounted on each of said axles outside of the associated side plate, said side plates being provided with arcuate slots which are concentric with said axles, said second frame having members on each end which extend through said slots and are secured to said discs, means for rotating said discs to produce vertical movement of said second frame relative to the first frame, said means comprising pinions on the ends of said bumper bar which engage the segments of said discs, and means for rotating said bumper bar.

6. A mower according to claim 5 wherein the segment on each disc is formed on the edge of a slot formed therein which is concentric with the axle with which it is associated, the pinions on the ends of said bumper bar being disposed in said slots and engaging said segments.

7. A mower according to claim 5 wherein releasable means is provided for normally locking said bumper bar against rotation.

8. A mower according to claim 5 wherein said means for rotating said bumper bar comprises a knob keyed to said bar adjacent one of said side plates, said knob being movable axially of said bar but being normally urged into contact with said plate by a spring associated therewith, the adjacent parts of said knob and said plate having portions which normally interfit with each other.

9. A mower according to claim 5 wherein means is provided for maintaining substantially constant the angle of the cutter knife relative to the ground regardless of the vertical position of said second frame, said means comprising guideways on said side plates and guide members carried by the second frame and cooperating with said guideways.

10. A mower according to claim 5 wherein said second frame comprises vertically spaced transverse members and connecting side members rigidly connected together, said cutting reel having a shaft which is journaled in bearings supported on said side members, one of said transverse members being provided with a knife edge.

11. A mower comprising a frame which includes side plates rigidly connected together by a transversely extending bumper bar at the forward side of the mower and a ground-engaging roller at the rear side of the mower, supporting wheels mounted on said side plates by axles which are rigidly secured thereto, a second rigid frame comprising vertically spaced transverse members and connecting side members rigidly connected together, one of said transverse members being provided with a cutter knife, a cutting reel having a shaft journaled in said side members and adapted to cooperate with said cutter bar, supporting wheels mounted on said side plates by axles which are rigidly secured thereto, said wheels being provided with internal gears, a segment-carrying disc mounted for rotation on each of said axles outside of the associated side plates, said side plates being provided with arcuate slots which are concentric with said axles and through which the ends of said cutting reel shaft pass, said ends also passing through openings formed in said discs, a pinion on each end of said shaft meshing with the internal gears of said wheels, means for rotating said discs to produce vertical movement of said second frame relative to the first frame, said means comprising pinions on the ends of said bumper bar which engage the segments of said discs, said bumper bar being rotatably mounted on said side plates and extending through aligning openings in said side plates and into arcuate slots in said discs which are concentric with said axles, the pinions being disposed in said slots and meshing with gear segments formed on the edges thereof, means for rotating said bumper bar, and means for normally locking said bumper bar against rotation.

12. A mower according to claim 11 wherein the segment-carrying discs close the inner sides of said wheels and fit into recesses formed in the outer sides of said side plates.

13. A mower according to claim 11 wherein said means for rotating said bumper bar comprises a knob keyed to said bar adjacent one of said side plates, said knob being movable axially of said bar but being normally urged into contact with said plates by a spring associated therewith, the adjacent parts of said knob and said plates having portions which normally interfit with each other.

14. A mower according to claim 11 wherein means is provided for maintaining substantially constant the angle of the cutter knife relative to the ground regardless of the vertical position of said second frame, said means comprising guide grooves formed on the inner surfaces of said side plates, and guide pins carried by the side members of said second frame and extending into said grooves.

15. A mower comprising a frame which includes side plates rigidly connected together by a transversely extending bumper bar at the forward side of the mower and a ground-engaging roller at the rear side of the mower which is carried by a shaft rotatably mounted on said side plates, supporting wheels mounted on said side plates by axles which are rigidly secured thereto, a second rigid frame which supports the cutting reel and associated cutter knife of the mower, a gear segment mounted on each of said axles outside of the associated side plate, said side plates being provided with arcuate slots which are concentric with said axles, said second frame having members on each end which extend through said slots and are secured to said segments, and means for swinging said segments about said axles to produce vertical movement of said second frame relative to the first frame, said means comprising a train of gears between said roller shaft and said segments and actuated by rotation of said shaft.

16. A mower according to claim 15 including means for normally locking said shaft against rotation.

17. A mower according to claim 5 wherein the cutting reel is provided with a shaft which is substantially parallel to the cutter knife and is carried by bearings supported by said second frame and means is associated with said bearings for moving the ends of said shaft relative to said frame to move said cutting reel relative to said knife.

18. A mower according to claim 1 wherein means is associated with said gears for maintaining substantially constant the angle of the cutter knife relative to the ground regardless of the vertical position of said second frame.

19. A mower according to claim 4 wherein guide means is provided between said frames for maintaining substantially constant the angle of the cutter knife relative to the ground regardless of the vertical position of said second frame.

BENNY T. GROBOWSKI.

REFERENCES CITED

The following references are of record in the file of this patent:

UNITED STATES PATENTS

| Number | Name | Date |
|---|---|---|
| 2,152,252 | Godwin et al. | Mar. 28, 1939 |
| 2,283,161 | Boonton | May 19, 1942 |
| 2,340,849 | Wildeboor et al. | Feb. 8, 1944 |
| 2,388,165 | Lowe et al. | Oct. 30, 1945 |

FOREIGN PATENTS

| Number | Country | Date |
|---|---|---|
| 113,287 | Australia | June 9, 1941 |
| 379,462 | Great Britain | Sept. 1, 1932 |